United States Patent
Rain et al.

(10) Patent No.: US 11,735,328 B2
(45) Date of Patent: Aug. 22, 2023

(54) CONTAINMENT BUILDING WITH A WINDOW

(71) Applicant: SAINT-GOBAIN GLASS FRANCE, Courbevoie (FR)

(72) Inventors: Joël Rain, Courcelles sous Jouarre (FR); Jean-Philippe Savary, Paris (FR); Jean-Clément Nugue, Senlis (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/765,040

(22) PCT Filed: Oct. 13, 2020

(86) PCT No.: PCT/EP2020/078749
§ 371 (c)(1),
(2) Date: Mar. 30, 2022

(87) PCT Pub. No.: WO2021/074130
PCT Pub. Date: Apr. 22, 2021

(65) Prior Publication Data
US 2022/0375642 A1    Nov. 24, 2022

(30) Foreign Application Priority Data

Oct. 14, 2019  (FR) ........................... 1911410
Oct. 14, 2019  (FR) ........................... 1911411

(51) Int. Cl.
*G21F 7/03*    (2006.01)
*G21F 7/01*    (2006.01)
*G21F 7/015*   (2006.01)

(52) U.S. Cl.
CPC ................ *G21F 7/03* (2013.01); *G21F 7/015* (2013.01)

(58) Field of Classification Search
CPC ................................... G21F 7/03; G21F 7/015
(Continued)

(56) References Cited

U.S. PATENT DOCUMENTS

| 11,488,738 | B2* | 11/2022 | Lemer ...................... G21F 7/03 |
| 2008/0016799 | A1* | 1/2008 | Sayer ........................ B01L 1/50 |
| | | | 52/204.1 |
| 2015/0040658 | A1* | 2/2015 | Abyzov ................ G01T 1/1606 |
| | | | 73/199 |

FOREIGN PATENT DOCUMENTS

| FR | 2840723 | 12/2003 |
| FR | 2858827 | 2/2005 |

OTHER PUBLICATIONS

International Search Reort as issued in International Patent Application No. PCT/EP2020/078749, dated Dec. 12, 2020.

* cited by examiner

*Primary Examiner* — Nicole M Ippolito
(74) *Attorney, Agent, or Firm* — Robert L. Carlson (57) ABSTRACT

A containment building includes a wall made of a material of the concrete type that delimits a space and at least one viewing module, the viewing module including at least one window arranged in an opening in the wall, the window having a frame in which at least one optical unit that provides protection from high-energy and/or neutron radiation is placed, the frame being fitted in the opening, the viewing module also having a protective element that includes a sash bearing a pane and is arranged so as to close the opening at the face on the inside of the building, the viewing module thus including at least one interface between two surfaces. The containment building also includes at least one sealing system arranged at at least one interface.

13 Claims, 7 Drawing Sheets

(58) Field of Classification Search
USPC ......... 250/505.1, 506.1, 507.1, 515.1, 516.1,
250/517.1, 518.1, 519.1
See application file for complete search history.

CONTAINMENT BUILDING WITH A WINDOW

CROSS-REFERENCE TO RELATED APPLICATIONS

This application is the U.S. National Stage of PCT/EP2020/078749, filed Oct. 13, 2020, which in turn claims priority to French patent application number 1911410 filed Oct. 14, 2019 and French patent application number 1911411 filed Oct. 14, 2019. The content of these applications are incorporated herein by reference in their entireties.

The invention relates to a containment building. Such a containment building is used for the storage or handling of specific products. These specific products are in particular products that emit radiation, and in particular radiation of the gamma type.

These containment buildings are composed of a wall forming an enclosed space, this wall being made of concrete. In order to be able to have a view of the inside of the building, a viewing system is arranged in said wall. Such a system comprises a sash embedded in the concrete wall. This sash has an opening in which a window is placed. This window comprises a frame in which a plurality of glass sheets that form a radiation-resistant unit are arranged. Preferentially, the sash is also equipped with a protective pane arranged between the window and the building. This protective pane provides additional protection.

The fitting of this window entails the need to have good airtightness. To this end, simple seals of the O-ring type are used and arranged at the interface of the protective pane with the sash. These seals make it possible to prevent the potentially contaminated air in the building from coming into contact with the window and the outside of the building.

However, it has been found that simple seals have a tendency to perform less well under the effect of radiation and time, and this may cause leaks to occur.

The occurrence of these leaks then makes it necessary to perform a maintenance operation consisting in removing the window in order to replace the seals. This maintenance operation is laborious and expensive.

SUMMARY OF THE INVENTION

The aim of the invention is therefore to solve the problem of the prior art by proposing a containment building that is provided with reliable and durable sealing.

The subject of the invention relates to a containment building comprising a wall made of a material of the concrete type that delimits a space and at least one viewing module, this viewing module comprising at least one window arranged in an opening in the wall, said window having a frame in which at least one optical unit that provides protection from high-energy and/or neutron radiation is placed, said frame being fitted in the opening, the viewing module also having a protective element that comprises a sash bearing a pane and is arranged so as to close the opening at the face on the inside of the building, said viewing module thus comprising at least one interface (I) between two surfaces, characterized in that it also comprises at least one sealing system arranged at at least one interface, said sealing system comprising at least one hermetic chamber at the periphery of the interface, said chamber being filled with a neutral gas, and in that said sealing system comprises a device for measuring the pressure in the chamber and a gas injection device for injecting an amount of neutral gas into the chamber depending on a value provided by the pressure measurement device. According to one example, the hermetic chamber is formed by a joining piece that cooperates with the two surfaces forming the interface.

According to one example, said joining piece comprises a single seal having a shape such that it has at least two contact points with one surface of the interface and at least one contact point with the other surface of the interface.

According to one example, said joining piece comprises two seals that are each in the form of a loop and are arranged concentrically between the two surfaces forming the interface.

According to one example, the casing comprises at least one channel for the sealed installation of the device for measuring the pressure in the chamber and of the gas injection device, said channel opening into the hermetic chamber.

According to one example, said at least one interface of the viewing module comprises two hermetic chambers that are each associated with a device for measuring the pressure in the chamber and a gas injection device for injecting an amount of neutral gas into the chamber.

According to one example, each chamber belongs to a separate sealing system.

According to one example, the two chambers are formed by a single joining piece.

According to one example, said joining piece comprises a single seal having a shape such that it has at least two contact points with one surface of the interface and at least three contact points with the other surface of the interface in order to form two separate chambers.

According to one example, the viewing module comprises a casing arranged in the wall, this casing having the opening.

According to one example, at least sealing system is arranged at the interface between said window and/or said protective element and the casing.

According to one example, each interface has a sealing system.

The invention also relates to a method for managing the sealing of a building as claimed in one of the preceding claims, characterized in that it comprises the following steps:
- measuring the pressure in the hermetic chamber using the pressure measurement device;
- comparing the measured pressure with a reference pressure value;
- activating the gas injection device for injecting an amount of neutral gas into the chamber if the measured value is lower than the reference value, said gas injection device injecting the amount of gas that allows the pressure in the hermetic chamber to reach the reference pressure value.

DESCRIPTION OF THE FIGURES

Other particular features and advantages will become clearly apparent from the following description thereof, which is given by way of entirely nonlimiting indication, with reference to the appended drawings, in which.

DETAILED DESCRIPTION

The present invention relates to a containment building, more particularly a building for the containment of materials that generate high-energy radiation such as X radiation, y radiation, and/or neutron radiation.

Figure 1:
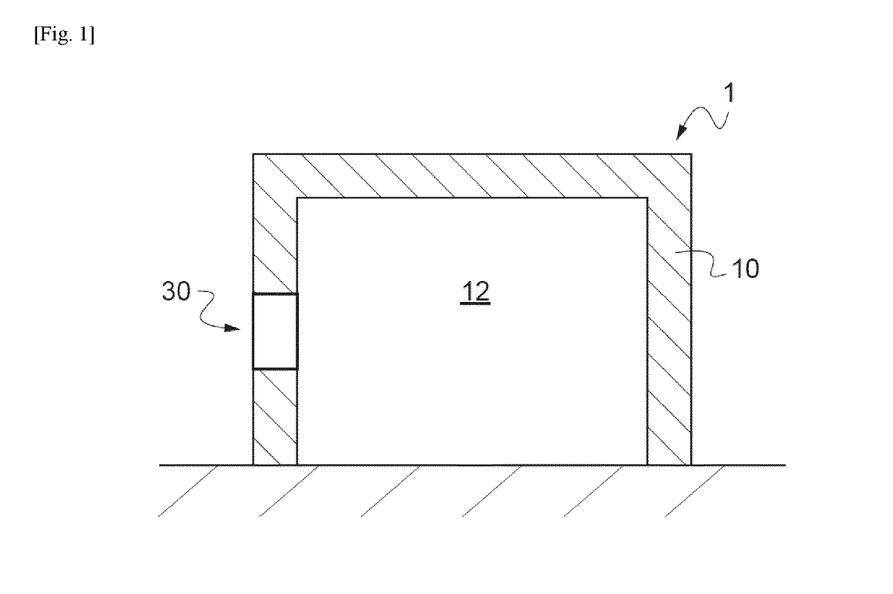
FIGS. 1 and 2 are schematic depictions of a containment building.

Such a building 1 comprises a wall 10 that delimits a space 12 as can be seen in FIG. 1. This wall 10 is made of a material of the concrete or reinforced concrete type, but can be made of any material for producing a containment building, such as steel or lead.

Figure 2:
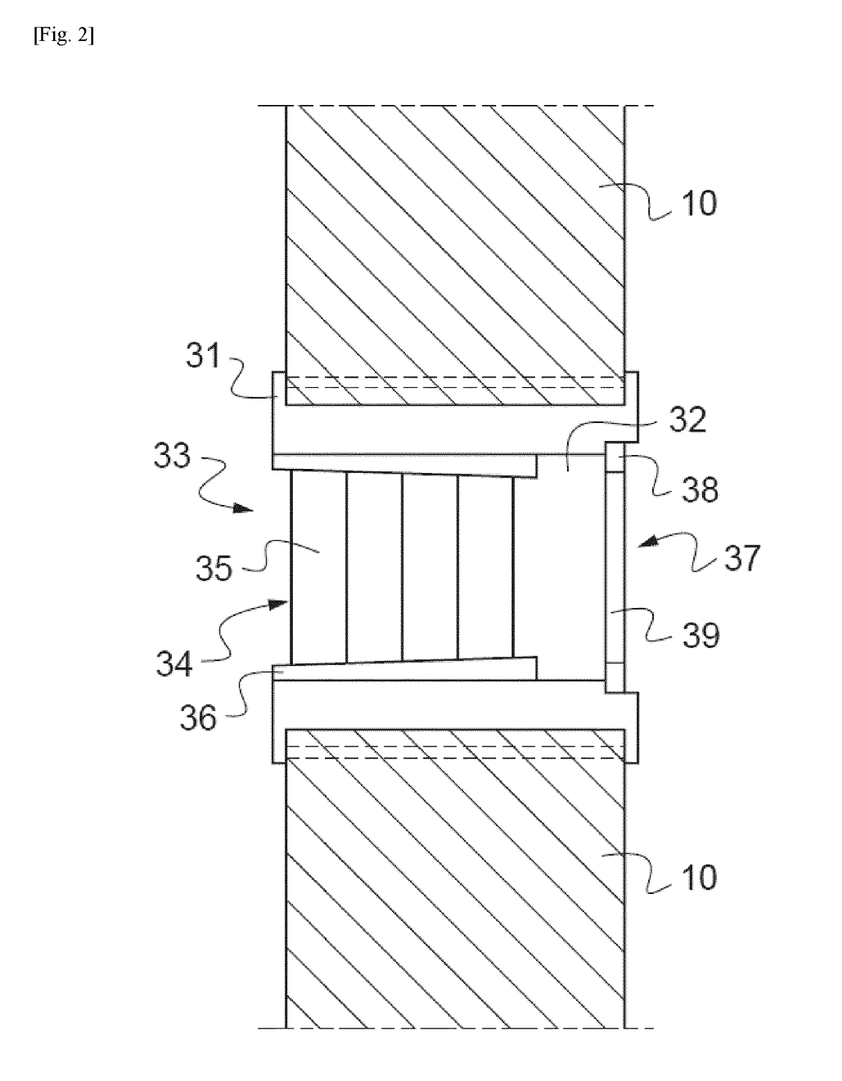

This building 1 comprises a viewing module 30 that allows an operator to observe what is taking place in said building 1, as can be seen in FIG. 2. Such a viewing module 30 comprises at least one window 33. This window 33 comprises an optical unit 34 comprising at least one glass sheet 35. Preferably, said optical unit 34 comprises a plurality of glass sheets 35 that are joined to one another. This optical unit 34 is arranged in a frame 36. Optionally, these glass sheets can be adhesively bonded or a filling material can be used to fill a space or clearance provided between the optical unit 34 and the frame 36.

The window 33 is then placed in an opening 32 in the wall 10. The frame 36 and the opening 32 are such that the frame 36 bearing the optical unit 34 is fitted in the opening 32. Fastening means, such as screws, are used to ensure durable fastening.

When this wall 10 is made of a material of the concrete type, a casing 31 is provided. This casing 31 is thus integrated, embedded in the wall 10. The casing 31 then comprises said through-opening 32.

Preferentially, the window 33 is inserted into the opening 32 from the operator side, i.e. via the face of the casing 31 on the outside of the building 1.

Optionally, the viewing module 30 also comprises a protective element 37. This protective element 37 is used to protect the window 33 from attacks from inside the building 1. To this end, this protective element 37 is arranged at the opening 32 on the inner face of the casing 31, i.e. the face of the casing on the inside of the building.

This protective element 37 comprises a sash 38 bearing a pane 39. The sash 38 is used to fasten said protective element 37 to the casing.

Figure 3:
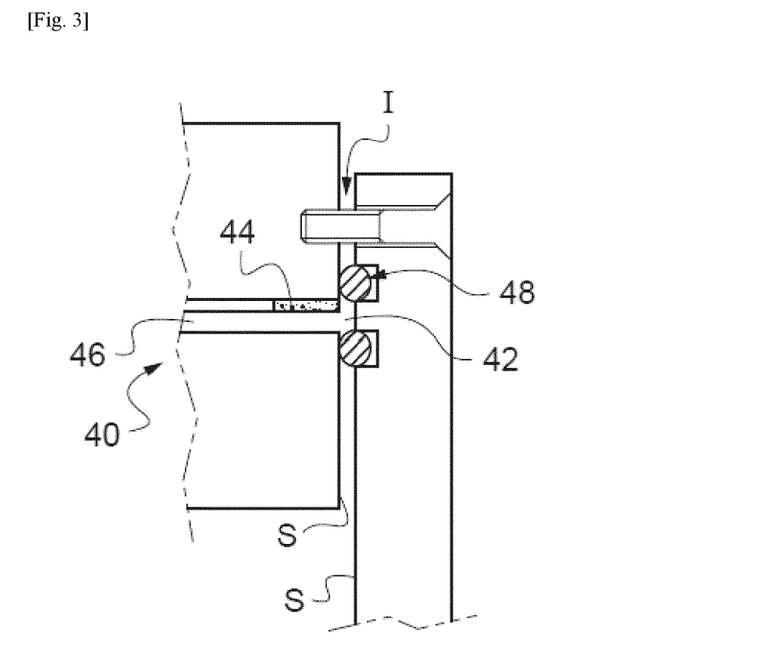
FIGS. 3 and 4 are schematic depictions of the sealing system according to the invention.
Figure 4:
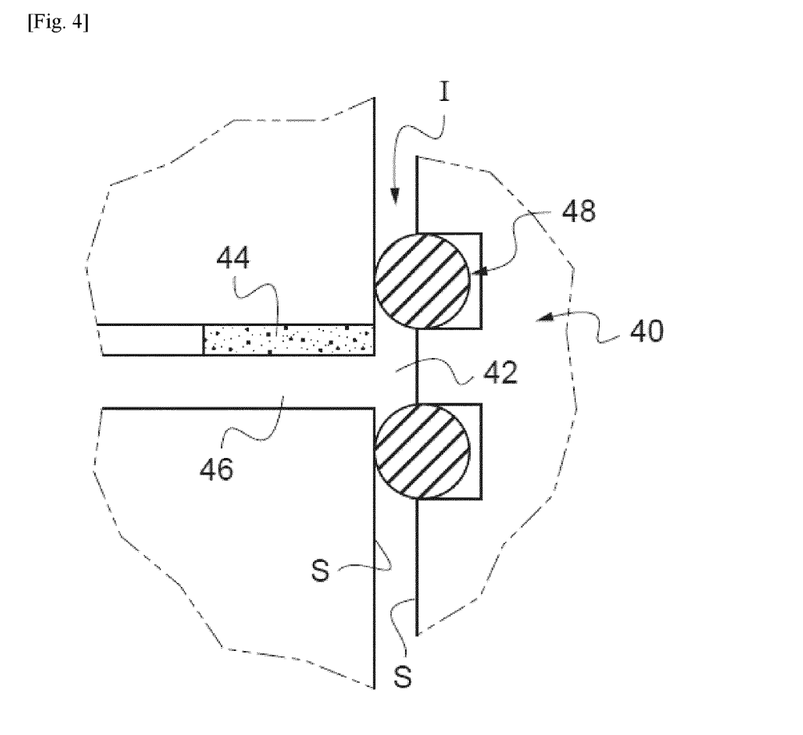

Cleverly according to the invention, the building 1 also comprises at least one sealing system 40. This sealing system 40 is arranged at one of the interfaces I of the viewing module 30, as can be seen in FIGS. 3 and 4. Such an interface I is defined as being the common joining surface between two surfaces S of separate components. For example, an interface I is present between the frame 36 and the casing 31 or between the sash 38 and the casing 31.

The sealing system 40 according to the invention comprises a hermetic chamber 42 arranged at the interface of the viewing module 30 to be sealed. This hermetic chamber 42 is associated with a pressure measurement device 44 and a gas injection device 46. Specifically, the hermetic chamber 42 is filled with a gas of the neutral type, such as nitrogen for example. This neutral gas is brought to a defined/reference pressure p. The pressure measurement device 44 is arranged so as to measure the pressure inside the hermetic chamber 42. The measurement device 44 thus generates a signal representative of the measured pressure. The measurement device used to measure the pressure has a sensitivity of 50 Pa, preferably 20 Pa, even more preferably 10 Pa and ideally 5 Pa. This signal is received by a computing unit (not shown) that compares the measured pressure value with the value of a defined pressure p in the chamber. If the measured value is different than the defined pressure value p, then a leak is present. Thus, a command is sent by said computing unit. This command is sent to the gas injection device 46. This gas injection device 46 (not shown in detail) comprises, for example and in a nonlimiting manner, a storage element, such as a gas cylinder or carboy, in which the gas is stored, optionally under pressure. This storage element is associated with a valve that is controllable by the computing unit and a flow meter. The computing unit is thus able to calculate, depending on the difference in pressure between the measured pressure and the defined pressure p, the amount of gas to be injected into the hermetic chamber 42. The controllable valve and the flow meter are used together to inject the correct amount of gas into an outlet pipe that leads into the hermetic chamber. This injection of gas into the hermetic chamber advantageously allows the sealing of the viewing module 30 to be made lasting.

The variation in the pressure depends on the pressure differential between the pressure in the hermetic chamber 42 and the pressure(s) on either side of the sealing system 40. If the pressure in the hermetic chamber is lower than that/those outside then a leak is characterized by an increase in the pressure in said hermetic chamber. By contrast, if the pressure in the hermetic chamber is higher than that/those outside, then a leak is characterized by a drop in the pressure in the chamber.

In the event of a drop in pressure, the pressure in the chamber is readjusted, whereas in the event of an increase, either an alarm is activated or the gas injection device 46 is able to evacuate an excess of pressure.

Ideally, the pressure in the hermetic chamber 42 will be greater than that in the building 1 so that a leak at the sealing system causes the gas to be transferred from the chamber 42 to the building.

More specifically, the hermetic chamber 42 is formed by a joining piece 48. This joining piece 48 cooperates with the two surfaces S forming the interface I such that a chamber is created. This joining piece 48 is, preferentially, designed such that it on the perimeter of the interface I so as to create a peripheral chamber 42. For example, if the two surfaces that create the interface are circular then the joining piece will be circular.

This joining piece 48 is in various forms.

Figure 5:
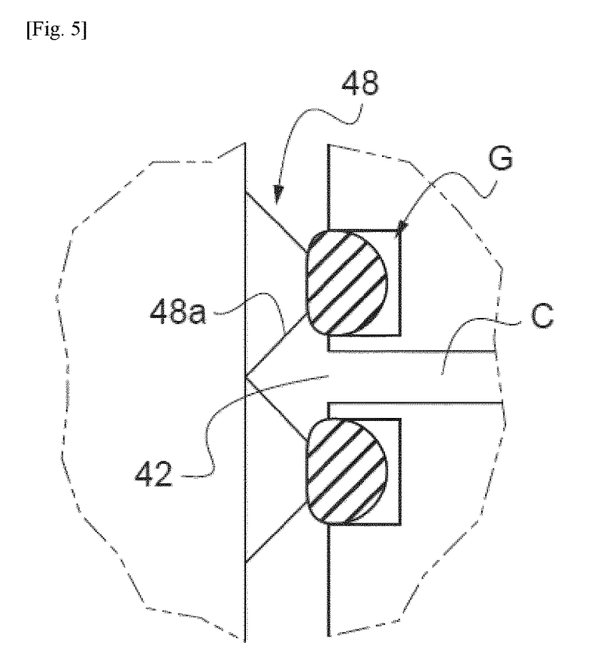
FIGS. 5 and 6 are schematic depictions of the joining piece forming the hermetic chamber.

A first form, which can be seen in FIG. 5, consists in having a joining piece 48 that comprises a single seal 48a. This single seal 48a has a shape such that it has at least two contact points with one surface S forming the interface and at least one contact point with the other surface S forming the interface. For example, a V- or W-shaped seal can be used. This single seal may have, at the contact points, a greater thickness in order to have a larger contact surface area and therefore better performance.

Figure 6:
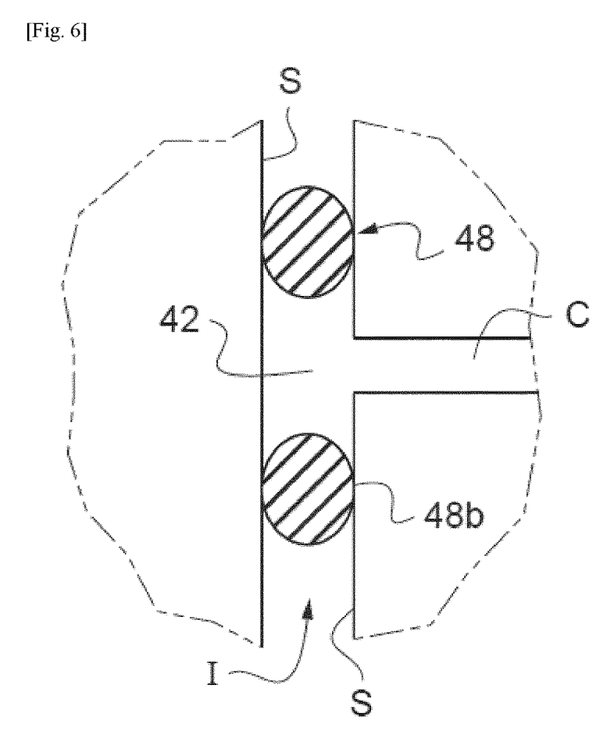

According to a second form, which can be seen in FIG. 6, the joining piece 48 is in the form of two seals 48a. Each seal 48b is in the form of a loop. The two seals 48b are then arranged so as to be disposed concentrically. Preferably, the two seals 48b are parallel to one another. The space between the two concentric seals 48b thus defines the chamber 42 in which the neutral gas is placed.

Optionally, grooves or slots G are arranged in the surfaces of the interface so that the joining piece 48 can be placed therein. This makes it possible to ensure correct positioning of said joining piece 48 and therefore to ensure optimal operation.

In order to be able to carry out the functions of measuring and of filling the chamber with gas, the hermetic chamber 42 is provided with at least one channel C via which the pressure measurement device 44 and the gas injection device 46 can act. This channel C consists of an opening in which the outlet pipe of the gas injection device 46 and the pressure measurement device 44 are arranged. The pressure measurement device 44 (not shown in detail) is, for example and in a nonlimiting manner, in the form of a single element having a sensor and a module for generating a signal in the same enclosure or in separate enclosures. The pressure measurement device 44 and the outlet pipe of the gas injection device 46 are fitted in said opening in a sealed manner. To this end, seals, for example of the O-ring type, are used.

It is also possible for two channels C to be arranged: a first channel C for the pressure measurement device 44 and a channel C for the gas injection device 46.

One variant consists in having two pressure measurement devices 44 for measuring the pressure in the same hermetic chamber 42. This variant makes it possible to have a redundancy effect that makes it possible to mitigate the failure of a sensor so as to prevent gas from being added to said hermetic chamber 42 in the absence of a drop in pressure.

The channel(s) C are preferentially arranged in the casing 31 so as to be able to have access to the pressure measurement device 44 and the gas injection device 46 from the outside. Nevertheless, it is possible for the channel(s) C to be able to comprise rigid or flexible connections so that they can be arranged as desired.

Figure 9:
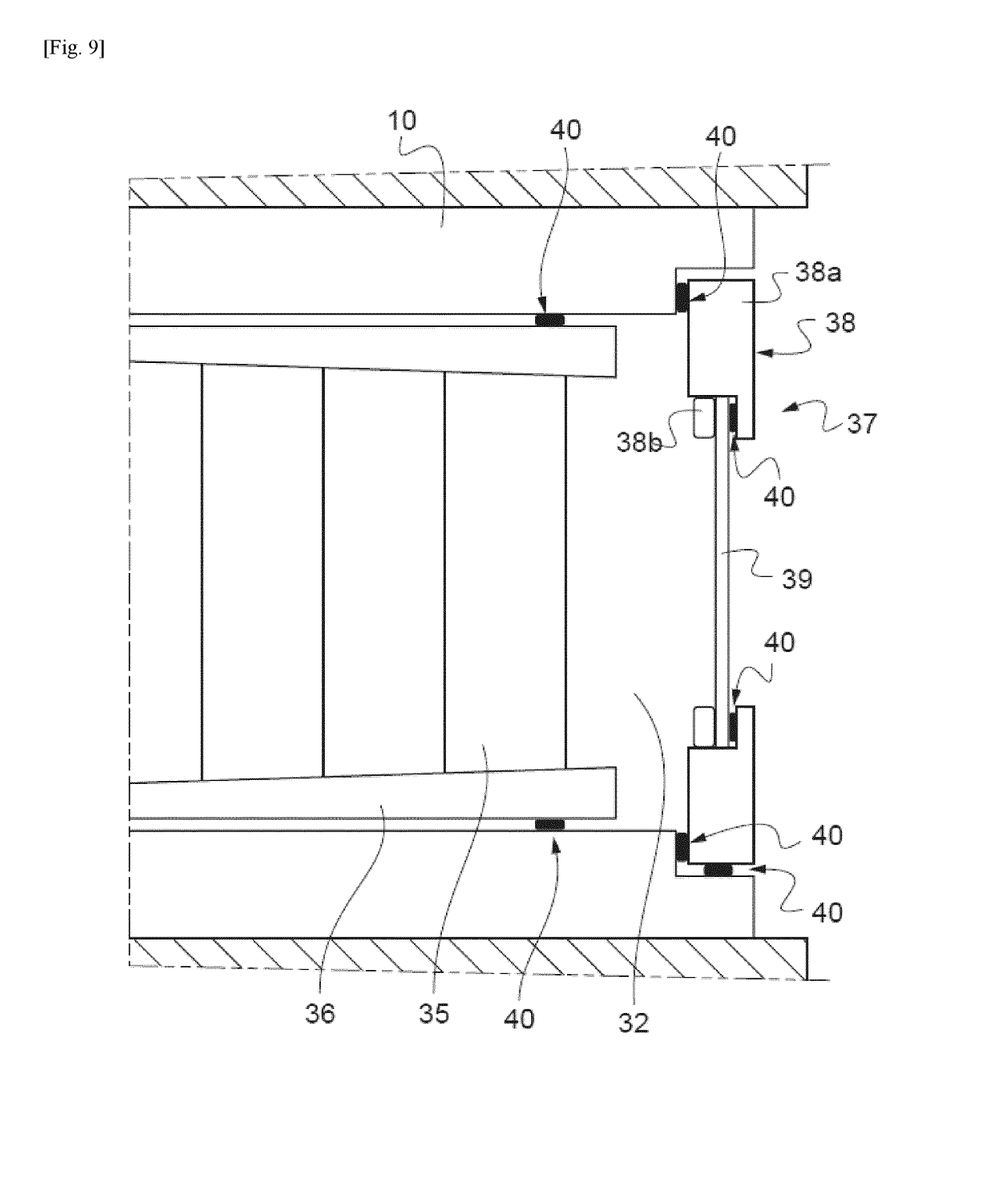
FIG. 9 is a schematic depiction of a viewing module bearing a plurality of sealing systems.

Specifically, the sealing system 40 according to the invention can be installed at at least one interface of the viewing module 30 but may be installed at different locations, or even at each interface. Such a viewing module 30 effectively comprises a large number of components that are fastened to one another, each interface I between two components being able to be sealed. For example in FIG. 9, the frame 38 of the protective element 37 bearing the pane 39 comprises a support 38*a* and a counter-support 38*b*. The support comprises a bearing surface on which the pane bears, the counter-support being arranged so as to be fastened to the support while allowing the pane to be interposed between the bearing surface of the support and the counter-support. It is therefore conceivable to put a sealing system 40 according to the invention at the interface between the pane and the bearing surface and/or at the interface between the pane and the counter-support and/or at the interface between the support and the counter-support.

Another variant consists in providing for the installation of two sealing systems 40 according to the invention for each interface, each sealing system 40 being independent. This variant advantageously makes it possible to have better sealing. The two sealing systems 40 that are used for the same interface I are arranged so that that the two chambers 42 are at the same or different pressures.

Figure 7:
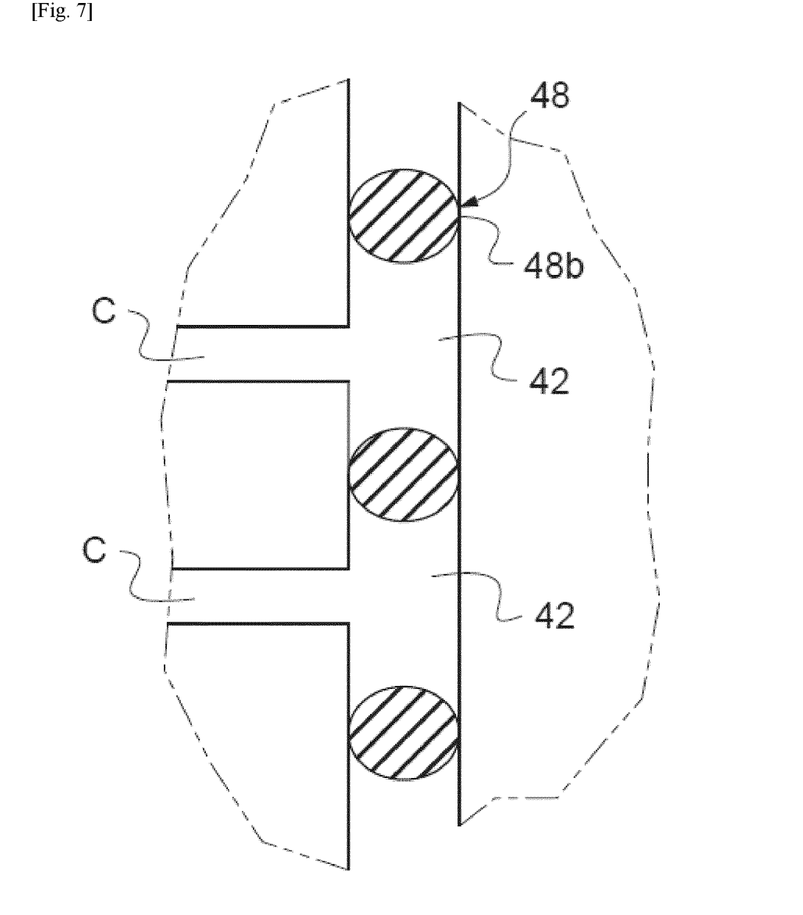
FIGS. 7 and 8 are schematic depictions of the joining piece forming two hermetic chambers.
Figure 8:
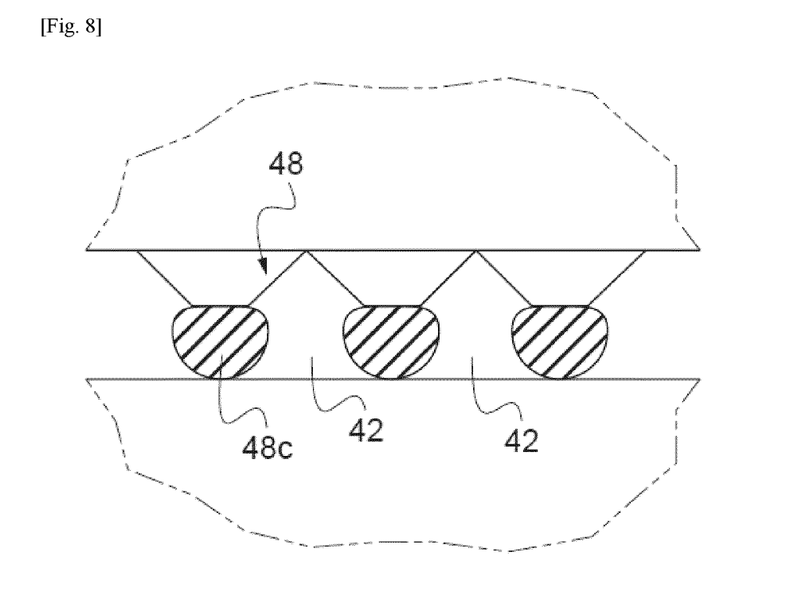

An alternative to this variant consists in having a joining piece 48 that is designed to define two separate hermetic chambers 42 as can be seen in FIG. 7. Each hermetic chamber cooperates with at least one pressure measurement device 44 and at least one gas injection device 46. The two hermetic chambers may exhibit the same pressure, but it is conceivable for the two hermetic chambers formed by the same joining piece 47 to be at different pressures. In this case, these two hermetic chambers are created by a single seal 48*c*, visible in FIG. 7, the shape of which allows the production of two separate hermetic chambers 42. However, these two hermetic chambers 42 can be created by three seals in the form of a loop that are arranged concentrically, as can be seen in FIG. 8.

Of course, the present invention is not limited to the example illustrated, but can be varied and modified in various ways that will become apparent to a person skilled in the art.

Thus, the sealing system of an interface between two surfaces comprises at least one hermetic chamber at the periphery of the interface, said chamber being filled with a neutral gas, and in that said sealing system comprises a device for measuring the pressure in the chamber and a gas injection device for injecting an amount of neutral gas into the chamber depending on a value provided by the pressure measurement device. This sealing system is used in the context of applications in chemistry or biology or for high-energy and/or neutron radiation.

According to one example, the hermetic chamber is formed by a joining piece that cooperates with the two surfaces forming the interface.

According to one example, said joining piece comprises a single seal that has a shape such that it has at least two contact points with one surface of the interface and at least one contact point with the other surface of the interface.

According to one example, said joining piece comprises two seals that are each in the form of a loop and are arranged concentrically between the two surfaces forming the interface.

According to one example, two hermetic chambers are arranged, each associated with a device for measuring the pressure in the chamber and a gas injection device for injecting an amount of neutral gas into the chamber.

According to one example, the two chambers are formed by a single joining piece.

According to one example, said joining piece comprises a single seal having a shape such that it has at least two contact points with one surface of the interface and at least three contact points with the other surface of the interface in order to form two separate chambers.

The invention also relates to a separating wall between an external environment and an internal environment, comprising an opening in which an insert is arranged, an interface between the surface of the wall and the surface of the insert, characterized in that at least one sealing system according to the invention is arranged at this interface.

According to one example, the wall and/or the insert comprise at least one channel for the sealed installation of the device for measuring the pressure in the chamber and the gas injection device, said channel opening into the hermetic chamber.

The invention also relates to a method for managing the sealing of a wall between an internal environment and an external environment as claimed in one of the preceding claims, characterized in that it comprises the following steps:
- measuring the pressure in the hermetic chamber using the pressure measurement device;
- comparing the measured pressure with a reference pressure value;
- activating the gas injection device for injecting an amount of neutral gas into the chamber if the measured value is lower than the reference value, said gas injection device injecting the amount of gas that allows the pressure in the hermetic chamber to reach the reference pressure value.

The invention claimed is:

1. A containment building comprising a wall made of a concrete material that delimits a space and at least one viewing module, said viewing module comprising at least one window arranged in an opening in the wall, said window having a frame in which at least one optical unit that provides protection from high-energy and/or neutron radiation is placed, said frame being fitted in the opening, the viewing module also having a protective element that comprises a sash bearing a pane and is arranged so as to close the opening at a face on the inside of the containment building, said viewing module thus comprising at least one interface between two surfaces, the containment building further comprising at least one sealing system arranged at the at least one interface, said sealing system comprising at least one hermetic chamber at a periphery of the interface, said at least one hermetic chamber being filled with a neutral gas, and said at least one sealing system comprises a pressure measurement device for measuring pressure in the at least one hermetic chamber and a gas injection device for injecting an amount of neutral gas into the at least one hermetic chamber depending on a value provided by the pressure measurement device.

2. The containment building as claimed in claim 1, wherein the hermetic chamber is formed by a joining piece that cooperates with the two surfaces forming the interface.

3. The containment building as claimed in claim 2, wherein said joining piece comprises a single seal having a shape such that the single seal has at least two contact points with one surface of the two surfaces forming the interface and at least one contact point with the other surface of the two surfaces forming the interface.

4. The containment building as claimed in claim 2, wherein said joining piece comprises two seals that are each in the form of a loop and are arranged concentrically between the two surfaces forming the interface.

5. The containment building as claimed in claim 2, wherein the building comprises at least one channel for the sealed installation of the device for measuring the pressure in the chamber and of the gas injection device, said channel opening into the hermetic chamber.

6. The containment building as claimed in claim 1, wherein said at least one interface of the viewing module comprises two hermetic chambers that are each associated with a device for measuring the pressure in the chamber and a gas injection device for injecting an amount of neutral gas into the chamber.

7. The containment building as claimed in claim 6, wherein each chamber of the two hermetic chambers belongs to a separate sealing system.

8. The containment building as claimed in claim 6, wherein the two hermetic chambers are formed by a single joining piece.

9. The containment building as claimed in claim 6, wherein said joining piece comprises a single seal having a shape such that it the single seal has at least two contact points with one surface of the two surfaces forming the interface and at least three contact points with the other surface of the two surfaces forming the interface in order to form two separate chambers.

10. The containment building as claimed in claim 9, wherein the viewing module comprises a casing arranged in the wall, the casing having the opening.

11. The containment building as claimed in claim 10, wherein at least sealing system is arranged at the interface between said window and/or said protective element and the casing.

12. The containment building as claimed in claim 11, wherein each interface has a sealing system.

13. A method for managing the sealing of a building as claimed in claim 1, comprising:
measuring the pressure in the hermetic chamber using the pressure measurement device;
comparing the measured pressure with a reference pressure value, and
activating the gas injection device for injecting an amount of neutral gas into the hermetic chamber when the measured value is lower than the reference pressure value, said gas injection device injecting the amount of gas that allows the pressure in the hermetic chamber to reach the reference pressure value.

* * * * *